United States Patent [19]

Drummond et al.

[11] Patent Number: 5,366,744
[45] Date of Patent: Nov. 22, 1994

[54] REFRIGERATED DOUGH PACKAGE AND METHOD

[75] Inventors: Rashmi Drummond, Vernon Hills; Karen Westerman-Courtright, Evanston; John C. Little, DesPlaines; Marcia Baxter, Chicago; David L. Wengerhoff, Buffalo Grove, all of Ill.

[73] Assignee: Kraft General Foods, Inc., Northfield, Ill.

[21] Appl. No.: 208,782

[22] Filed: Mar. 9, 1994

Related U.S. Application Data

[63] Continuation of Ser. No. 858,080, Mar. 26, 1992, abandoned.

[51] Int. Cl.$^5$ .................. B65B 31/00; B65D 81/20
[52] U.S. Cl. .................................. 426/128; 426/396; 426/418; 426/316; 53/432
[58] Field of Search ............... 426/128, 119, 124, 113, 426/418, 419, 410, 396, 316; 53/432

[56] References Cited

U.S. PATENT DOCUMENTS

| | | | |
|---|---|---|---|
| 1,554,077 | 9/1925 | Fay | 426/113 |
| 2,753,268 | 7/1956 | Ingle | 426/410 |
| 2,949,369 | 8/1960 | Zoeller et al. | |
| 2,955,045 | 10/1960 | Coffey et al. | 426/410 |
| 2,967,777 | 1/1961 | Grindrod et al. | 426/410 |
| 2,980,540 | 4/1961 | Turpin | |
| 3,102,818 | 9/1963 | Zoeller et al. | |
| 3,148,635 | 9/1964 | Reid | |
| 3,222,189 | 12/1965 | Perozzi | |
| 3,304,185 | 2/1967 | Fortney | 426/128 |
| 3,506,183 | 4/1970 | Turpin et al. | |
| 3,510,050 | 5/1970 | Culley et al. | |
| 3,522,061 | 7/1970 | Whiteford | 426/108 |
| 3,524,401 | 8/1970 | Hosfield et al. | |
| 3,677,774 | 7/1972 | Rausing | 426/108 |
| 3,874,548 | 4/1975 | Buff | 426/128 |
| 3,879,563 | 4/1975 | Tucker et al. | 426/128 |
| 3,972,468 | 8/1976 | Reid | |
| 4,120,984 | 10/1978 | Richardson et al. | 426/128 |
| 4,297,378 | 10/1981 | Haasl et al. | 426/532 |
| 4,337,116 | 6/1982 | Foster et al. | 426/113 |
| 4,372,982 | 2/1983 | Haasl et al. | 426/549 |
| 4,381,315 | 4/1983 | Yong et al. | 426/94 |
| 4,388,336 | 6/1983 | Yong et al. | 426/551 |
| 4,415,598 | 11/1983 | Chen et al. | 426/124 |
| 4,526,801 | 7/1985 | Atwell | 426/128 |
| 4,548,852 | 10/1985 | Mitchell | 426/124 |
| 4,840,271 | 6/1989 | Garwood | 426/418 |
| 4,919,949 | 4/1990 | Miltz et al. | 426/128 |
| 5,106,635 | 4/1992 | McCutchan et al. | 426/113 |

FOREIGN PATENT DOCUMENTS

| | | | |
|---|---|---|---|
| 499837 | 2/1954 | Canada | 426/128 |
| 0368601 | 5/1990 | European Pat. Off. | 426/113 |
| 2533806 | 4/1984 | France | 426/128 |
| 821371 | 10/1959 | United Kingdom | 426/119 |

OTHER PUBLICATIONS

Wiley Encyclopedia of Packaging Technology 1986 J. Wiley & Sons, pp. 218–221 1986.
Food & Drug Packaging Dec. 1985 p. 3.
Food Processing Jan. 1985.
Plastics Technology Dec. 1985 p. 61 plus.

*Primary Examiner*—Steven Weinstein
*Attorney, Agent, or Firm*—Fitch, Even, Tabin & Flannery

[57] ABSTRACT

The present invention is directed to a method for making a packaged dough suitable for extended refrigerated storage and to a packaging system for storage of the refrigerated dough. In the packaging system for storage of refrigerated, leavened dough, a substantially rigid tray for receiving a leavened dough product is provided. The tray has a bottom wall and upstanding peripheral side walls to define at least one well. At least one leavened dough product is disposed within the well. The leavening of the dough is at least partially reacted to provide carbon dioxide distributed throughout the dough product. A hermetically sealed cover, extending at least over the top of the side walls to define a chamber containing the dough product and a headspace surrounding the dough product is provided. A gas comprising a predetermined amount of carbon dioxide is disposed in the headspace of the chamber in order to create an equilibrium level of carbon dioxide with the carbon dioxide produced in the dough product. The ambient air is replaced by the gas thereby minimizing the amount of residual oxygen and hence, oxidation of the dough product.

14 Claims, 3 Drawing Sheets

REFRIGERATED DOUGH PACKAGE AND METHOD

This application is a continuation of application Ser. No. 07/858,080 filed Mar. 26, 1992, now abandoned.

FIELD OF THE INVENTION

The present invention is directed to refrigerated dough products. More particularly, the present invention relates to a packaging system for refrigerated dough products which permits refrigerated storage of the dough products for periods in excess of 90 days.

BACKGROUND OF THE INVENTION

Refrigerated dough or fresh dough is a dough product distributed under refrigeration and sold from a refrigerated case at the grocery store. Typically, the dough is chemically leavened and formulated for storage in pressurized containers which will maintain the pressure generated by the leavening action of the leavening agent of the dough during a proofing step in the container prior to refrigerated storage. To prepare biscuits or the like from such contained doughs, the end user must open the container, remove the dough from the container and assemble the dough in or on an appropriate baking utensil and place in the oven and bake.

Carbon dioxide produced by the leavening system used in refrigerated dough packages can escape slowly from the dough and from the package during proofing. The escape of a sufficient volume of carbon dioxide produces deficiencies in the finished dough products after baking, the most notable being a loss of volume. While it is possible to improve gas-retaining properties of dough products intended for refrigerated storage by working the dough for longer periods of time prior to packaging and/or using chemical dough conditioners, this approach provides a baked good of sub-optimal quality. Additionally, the effect of the pressure within the can on the texture of the baked product is to create an airy, spongy texture which is sub-optimal.

U.S. Pat. No. 3,524,401 to Hosfield, et al. describes a composite refrigerated dough product for making baked goods, such as biscuits, which have good carbon dioxide retention properties. The composite refrigerated dough product of the Hosfield, et al. patent consists of a body of undeveloped dough at least partially enveloped in a layer of developed dough that prevents gas from escaping and allows the dough bodies to be handled, cut and packed. While the method of the Hosfield, et al. patent may provide a solution to the escape of carbon dioxide, such solution still suffers from the use of a highly worked dough which results in at least some of the attendant toughness properties associated with such highly worked dough.

Accordingly, it is a principal object of the present invention to provide a fresh dough product packaging system whereby the problems associated with carbon dioxide loss from the dough and the reactive effects of pressure on the dough during distribution and storage are resolved.

It is another object of the present invention to provide a fresh dough product which is contained in an unpressurized, hermetically sealed gas and moisture barrier container for refrigerated storage.

It is another object of the present invention to provide a method for making a packaged dough suitable for extended refrigerated storage.

It is another object to provide a packaging system which due to its unpressurized state, makes it possible for the manufacturer to provide finished, assembled dough products ready for baking, with no assembly required by the end user.

It is another object to provide a system for refrigerated distribution and sale of unformed "liquid" doughs, e.g., muffins, brownies, cupcakes and quickbreads.

It is another object to remove the necessity of a proofing step in the manufacture of the products; although the manufacturer may still wish to incorporate a proofing step for the development of specific product characteristics.

SUMMARY OF THE INVENTION

Figure 1:
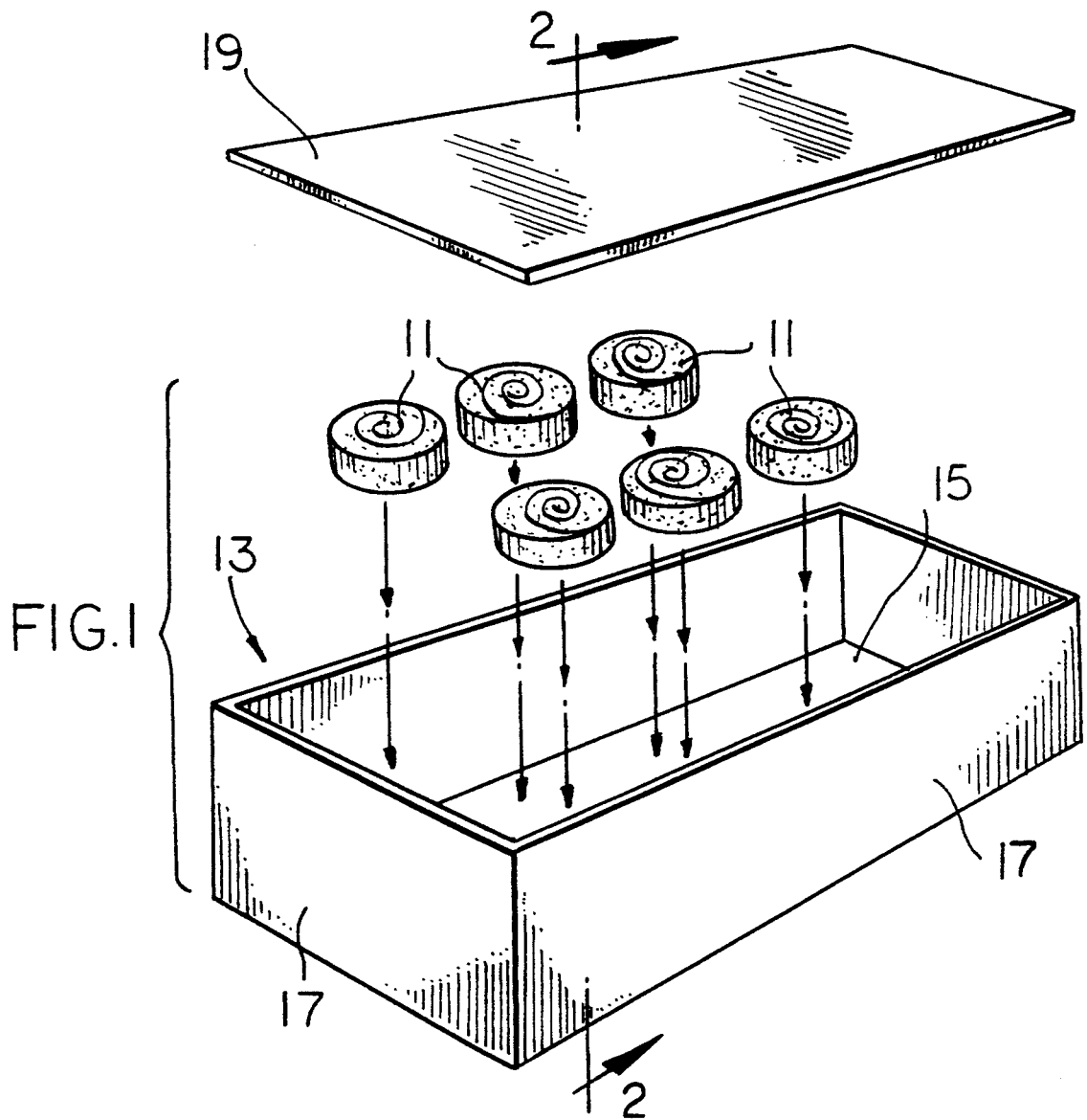
FIG. 1 is an exploded view of the packaging system of the present invention showing the sequence of assembling the components of the system.
Figure 2:
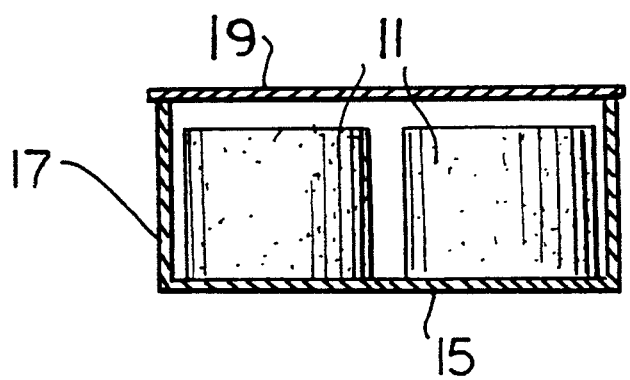
FIG. 2 is a cross-section of the assembled package along the lines 2—2 of FIG. 1.

The present invention is directed to a method for making a packaged dough suitable for extended refrigerated storage and to a packaging system for storage of the refrigerated dough. In the packaging system for storage of refrigerated, leavened dough, a substantially rigid tray for receiving a leavened dough product is provided. The tray has a bottom wall and upstanding peripheral side walls. A leavened dough product is deposited within the tray on the surface of the bottom wall. The reaction of chemical leavening of the dough is minimized in mixing but provides for distribution of carbon dioxide and/or unreacted leavening agents throughout the dough product. A hermetically sealed gas and moisture barrier cover, extending at least over the top of the side walls to define a chamber containing the dough product and a headspace surrounding the dough product is provided; or a hermetic, barrier overwrap enrobes the package. A gas comprising a predetermined level of carbon dioxide is disposed in the headspace of the chamber in order to create an equilibrium level of carbon dioxide with the carbon dioxide produced in the dough product to control and/or maintain leavening capability. The ambient air is replaced by the gas thereby minimizing the amount of residual oxygen and hence, oxidation of the dough product. The dough may be chemically or yeast leavened with a cold sensitive yeast which becomes inactivated at refrigeration temperatures.

In the method of the present invention, flour, salt, a leavening agent and a fluid are combined in amounts sufficient to form a dough mass. The components of the dough mass are mixed under conditions whereby the dough mass is developed and some carbon dioxide is produced in the dough. The dough mass is placed into a container. The headspace of the container is flushed with a gas comprising a predetermined amount of carbon dioxide. The container is then hermetically sealed with the gas in place in the headspace. The container is then refrigerated to limit further development of carbon dioxide by the chemical leavening agent.

While not wishing to be bound by any theory, it is believed that the presence of carbon dioxide in the headspace of the package at an appropriate concentration establishes an equilibrium with the carbon dioxide of the dough product to prevent the leavening reaction from further producing carbon dioxide based on a concentration gradient and/or simply inhibiting the migration of carbon dioxide from the dough to the headspace based on the same concentration gradient.

DETAILED DESCRIPTION OF THE INVENTION

The present invention is adapted for the refrigerated storage of a wide variety of dough types, such as biscuits, muffins, sweet rolls, bread products and brownies. The packaging system of the present invention utilizes a non-pressurized, hermetically sealed gas and moisture barrier package and does not require a container which is resistant to pressure heretofore associated with proofing dough products, such as biscuits, in the container.

Generally, in accordance with the method of the invention, a dough mass is prepared from a dough composition comprising flour, shortening, water and leavening agent selected from yeast and chemical leavening agents. The chemical leavening agents include a leavening base, such as sodium bicarbonate and a leavening acid. It is preferred to use a slow acting leavening acid, such as sodium acid pyrophosphate (SAPP), although other commonly used chemical leavening agents may also be used. The dough mass is prepared under conditions to limit the reaction of the leavening agent to form carbon dioxide. This may be accomplished by adding part of the water during the mixing process as ice in order to slow the reaction by lowering the temperature. The temperature of the dough mass during mixing of the dough components should be kept in the range of from about 60° to about 80° F. This can also be accomplished by mixing the dough components in a jacketed mixing apparatus, with an appropriate cooling medium in the jacket such as chilled water.

Some development of carbon dioxide occurs during the development of the dough mass into the dough product. The dough mass may be then sheeted and cut or otherwise formed into shapes suitable for consumer use.

As shown in FIG. 1, dough product pieces 11 are placed into a tray 13 so as to be in direct contact with the bottom surface of the tray, but not necessarily covering the entire bottom surface. The tray includes a bottom wall 15 and peripheral side walls 17. The height of the side walls 17 is sufficient that the top surface of the dough pieces lies beneath the topmost part of the side wall. The headspace existing in the package, which consists of the interstitial space between the dough product pieces and the space overlying the top of the dough pieces and beneath the topmost part of the side wall is then flushed with a gas comprising a predetermined amount of carbon dioxide. The tray is then hermetically sealed with a moisture and gas barrier cover 19 while the gas is maintained in place in the headspace of the package.

Figure 3:
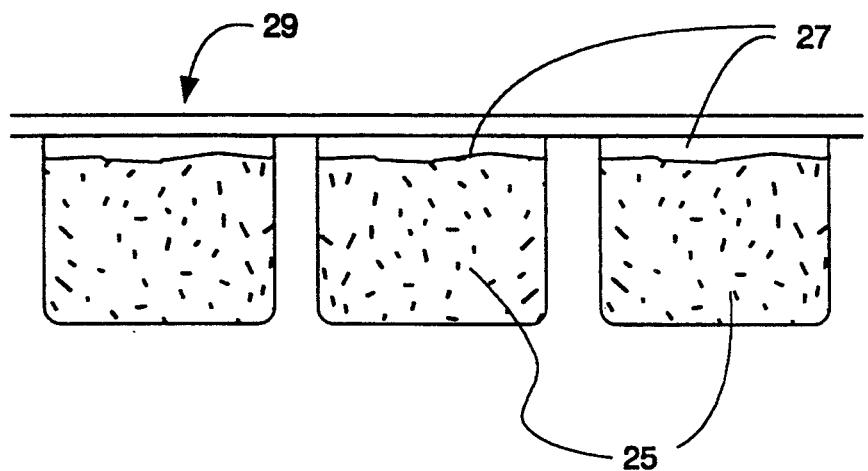
FIG. 3 is a cross-section of a further embodiment of the packaging system of the invention.

Alternatively, more "liquid" doughs may be placed in individual cup-shaped trays, affording the same general construction to allow for headspace above the product as shown in FIG. 3.

Figure 4:
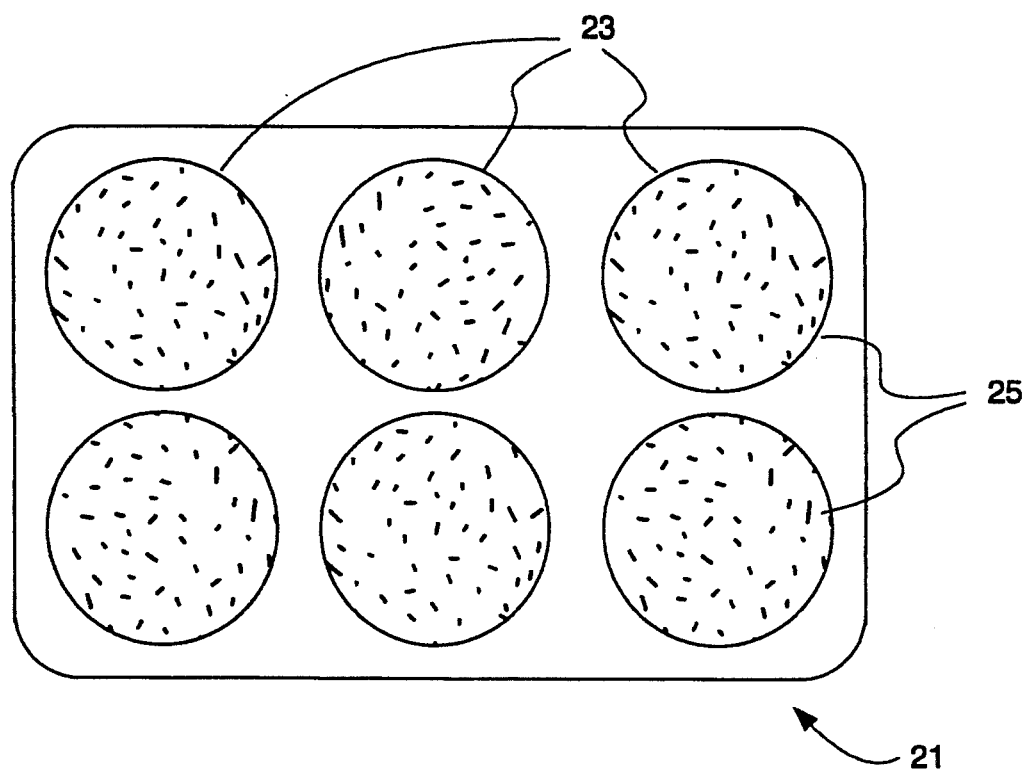
FIG. 4 is a top view of FIG. 3.
Figure 5:
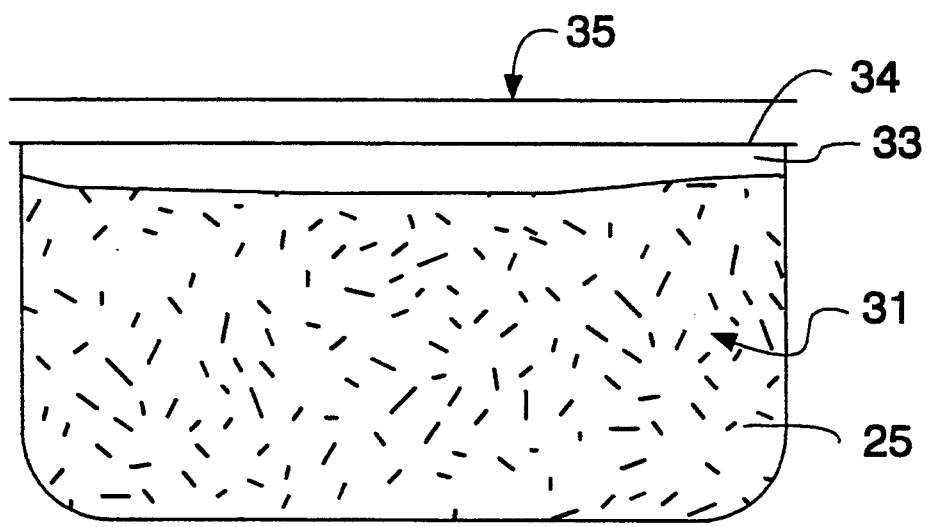
FIG. 5 is a cross-sectional view of another embodiment of the packaging system of the invention.
Figure 6:
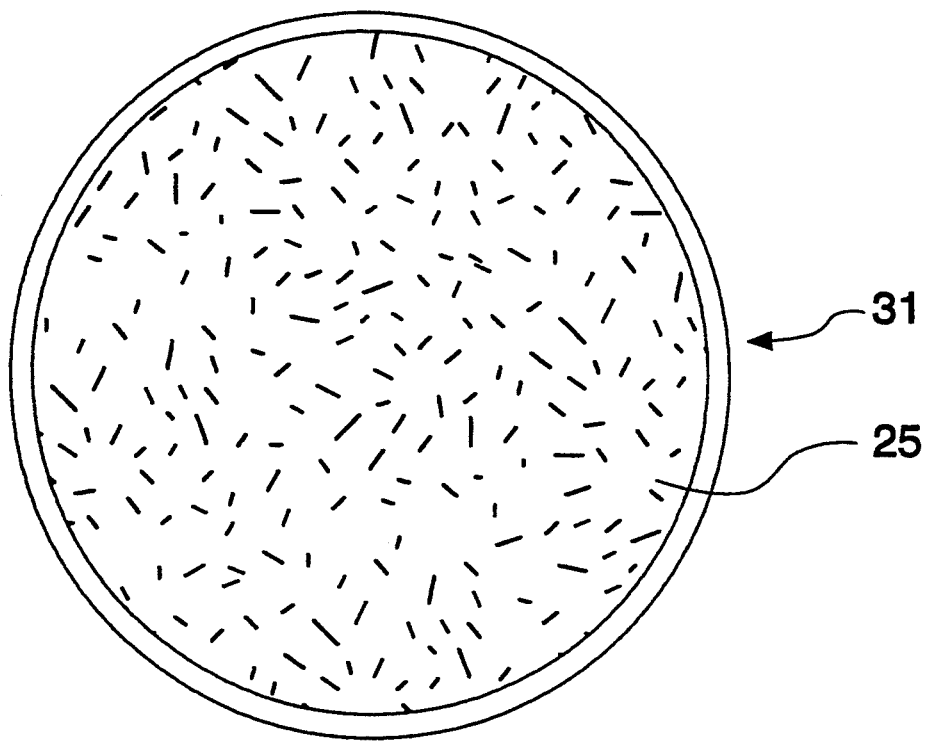
FIG. 6 is a top view of FIG. 5.

"Liquid" doughs are doughs which will flow to fill a container. Such doughs include brownie, muffin, quickbread, cupcakes, etc. FIGS. 3 and 4 show a package configuration comprising muffin pan 21 having a plurality of muffin cups 23, each of a predetermined depth. Muffin or cupcake dough 25 is placed in the cups allowing a headspace 27 of 10–40% of the depth of the muffin cup. The muffin pan 21 is constructed from a gas and moisture barrier material, e.g., crystalline polyester (CPET). The pan is hermetically sealed with cover 29 which is a gas and moisture barrier. A gas and moisture barrier overwrap may alternatively be used. Once prepared in the manner described, a shelf life in excess of 90 days is provided for.

Alternatively, "liquid" dough 25 may be deposited in a bowl-like container 31 for sale in bulk quantities from which the consumer can remove the desired quantity. As in the case of the muffin pan 21, the container 31 is filled to a predetermined depth to allow for a headspace 33 of 10–40% of the depth. The container may be constructed of a gas and moisture barrier material, e.g., CPET or constructed of a non-barrier and hermetically sealed with a membrane 34 which is a gas and moisture barrier. A lid 35 may be applied thereover or the lid itself may serve as a gas and moisture barrier. Alternatively, a container which is not a gas and moisture barrier can be used if the container is completely overwrapped with a gas and moisture barrier film.

The headspace gas contains sufficient carbon dioxide to produce an equilibrium of carbon dioxide in the product and package. By "equilibrium level" is meant that the carbon dioxide in the headspace gas is present in an amount which is sufficient to preserve the leavening capability of the dough product throughout the shelf life. In general, the equilibrium level of carbon dioxide in the headspace gas will be at a volume ratio of from about 0.3:1 to about 1.7:1 of the carbon dioxide in the dough product. It has been surprisingly learned in accordance with the method of the present invention, that when an equilibrium level of carbon dioxide is maintained in the headspace of a non-pressurized, hermetically sealed package containing a dough product, that the dough product can be maintained in refrigerated storage for periods in excess of 90 days without substantial carbon dioxide migration losses from the dough product and without deterioration of the texture and baking characteristics of the dough product.

The carbon dioxide gas may be combined with another inert gas or gas mixture to provide the equilibrium level of carbon dioxide required in the package. Suitable inert gases include nitrogen, neon, argon and helium. The level of carbon dioxide gas required depends on the level of carbon dioxide produced in the dough product, which is dependent on the amount of leavening agent introduced into the dough product formula, the extent of proofing and development of the dough product and the type of dough product. Carbon dioxide will be present in the headspace at a level of at least 10 volume percent for the least developed dough products, such as brownies, up to a level of 100 volume percent, for more fully developed dough products, such as sweet roll dough.

It has also been determined that evacuation of the headspace gas by vacuum is not a suitable method for extracting the ambient air surrounding the dough product. Vacuum extraction of the ambient air results in removal of some gaseous components from the dough product and provides an inferior dough product. It has also been determined that the use of an inert gas that does not comprise an equilibrium level of carbon dioxide is not a suitable means for preserving the dough product under refrigerated storage. When an inert gas, such as nitrogen, is used as the sole headspace gas, carbon dioxide is generated in the dough product and/or migrates from the dough product into the headspace gas and serious product deterioration results. After the dough product has been hermetically sealed in the packaging system of the invention, the dough product should be immediately refrigerated to prevent further development of carbon dioxide and development of pressure in the package. Preferably, the temperature of the dough product should be reduced to refrigeration temperatures of 35°–50° F. within 120 minutes after the hermetic seal is formed.

The dough product of the invention can, of course, contain other conventional dough components, such as salt, sugar, milk solids, egg, and shortening, such as margarine, butter, lard and vegetable oils. The dough product may also be covered with a topping or formed into a filled product, such as by covering the dough product with a cinnamon preparation or other filling, rolling the dough product into a spiral and thereafter cutting slices of the spiral to provide cinnamon or filled rolls.

Unlike currently available refrigerated dough products, doughs for products such as muffins, cupcakes, brownies and quickbreads may be provided in accordance with the present invention as well as braided coffee cake.

While the development of carbon dioxide in the dough product during working of the dough is preferably minimized and for some dough products may be substantially zero, the dough product may be partially or fully proofed prior to hermetically sealing the tray as described heretofore. The two important aspects of the invention are still pertinent to partially or fully proofed dough products, i.e., providing an equilibrium level of carbon dioxide in the headspace and refrigerating the dough product after hermetic sealing.

The tray which is used to package the dough product can be a tray in which the dough product is baked after the package is opened by the consumer. Suitable tray materials for this purpose include metal, such as aluminum foil and certain types of plastic and paperboard which can withstand baking temperatures of up to 400° F. A suitable plastic for this purpose is crystallized polyethylene terephthalate. Non-bakable trays, of course, can also be used. The consumer would then have to remove the dough product from the tray at the time of baking and place the dough product on a baking sheet or other appropriate baking utensil. Suitable non-bakable tray materials include lined paperboard and plastics that do not maintain their integrity at temperatures up to 400° F.

The tray material should be capable of providing a barrier from escape of gases and moisture and the entrance of oxygen from the environment. The cover should also be made from a material that will prevent loss of moisture and gas. The cover material may be used to fully enwrap the tray, and, in this embodiment, tray materials which are not resistant to loss of moisture and gas can be used.

The following example further illustrates various features of the invention but are intended to in no way limit the scope of the invention as set forth in the appended claims.

EXAMPLE 1

A sweet roll dough was prepared in accordance with the following process. The following ingredients were combined in a planetary type commercial mixer provided with an E-pin.

| Ingredient | Weight/Grams |
| --- | --- |
| Flour | 1600 |
| Salt | 40 |
| Sodium Bicarbonate | 20 |
| Leavening acid | 35 |
| Sugar | 200 |
| Milk | 400 |
| Whole Eggs | 100 |
| Fat | 130 |
| Water | 400 |

The dough product was prepared by adding the water, milk and whole eggs to the dry ingredients in the jacketed planetary mixer. Mixing was performed for 15 minutes to develop the gluten of the dough. The dough was sheeted and a filling containing the following ingredients was added to the surface of the dough.

| Ingredient | Weight/Grams |
| --- | --- |
| Sugar | 450 |
| Cinnamon | 70 |
| Fat | 450 |

The filling was added to the surface of the sheeted dough at a level of 400 grams per 1000 grams of dough.

The dough sheets with filling applied to the top thereof were then rolled into a spiral shape to form cylinders. Cylindrical pieces of the dough were then cut and placed into a crystallized polyethylene terephthalate tray.

The tray containing the dough pieces was then passed through a Delta-P ™, modified atmosphere packaging film wrapper manufactured in Ilapak, Switzerland. A roll of moisture and gas barrier film is fed through the unit where the bottom of the film is hermetically sealed forming a tunnel. A metal tube, with port holes, is located within the tunnel from end to end. The desired gas composition flows through the port holes and fills the environment within the tunnel. The package containing the dough pieces is pushed into the tunnel by a conveyor system and pulled to the end of the tunnel by friction caused between the film and the tray material. As the package passes through the tunnel, the headspace is flushed with 100% carbon dioxide. Once the package comes to the end of the tunnel, the front end of the film is hermetically sealed followed by a final hermetic seal to contain the carbon dioxide headspace gas. The final package then passes through a shrink tunnel where the film is tightly shrunk around the package. In the present example, the headspace volume was 25% of the package interior and the dough product volume was 75%.

The hermetically sealed package was then placed in refrigerated storage and the temperature of the dough product was reduced to approximately 40° F. in a time of 30 minutes. A plurality of hermetically sealed packages were placed in refrigerated storage and were maintained in refrigerated storage for 90 days with sampling of the packages made every 14 days during the storage period. It was determined that the dough product was equally suitable for baking after a 90 day period of refrigerated storage to provide a desired cinnamon roll product.

What is claimed is:

1. A packaging system for storage of refrigerated, chemically leavened dough products comprising:
   (a) a substantially rigid tray having at least one well for receiving a chemically leavened dough product, said tray having a bottom wall and upstanding peripheral side walls;
   (b) a leavened unbaked dough product deposited within said well, said dough product having a size to allow a headspace of at least about 10% of the depth of the well, the leavening of said unbaked dough product being at least partially reacted to provide carbon dioxide distributed throughout said dough product;
   (c) a gas from a source outside the tray displacing the ambient air in said headspace, said gas consisting essentially of carbon dioxide or a carbon dioxide and inert gas mixture disposed in said headspace of said tray in a volume ratio of carbon dioxide in the headspace of the tray to carbon dioxide in the dough product of from about 0.3:1 to about 1.7:1 to inhibit the leavening reaction of the unbaked dough product to prevent further production of carbon dioxide in the dough product and to maintain the leavening capability of the unbaked dough over the shelf life of the dough product; and
   (d) a hermetically sealed cover extending over at least the top of said side walls to define a chamber containing said unbaked dough product and a headspace containing said gas surrounding said dough product.

2. A packaging system in accordance with claim 1 wherein said carbon dioxide is present in said headspace gas at a level of from about 10 volume % to 100 volume %.

3. A packaging system in accordance with claim 1 wherein said hermetically sealed cover fully enwraps said tray.

4. A packaging system in accordance with claim 1 wherein the dough product is selected from the group consisting of a sweet roll, coffeecake, muffin and brownie dough product.

5. A packaging system in accordance with claim 1 wherein said headspace gas is a mixture of an inert gas and an equilibrium level of carbon dioxide.

6. A packaging system in accordance with claim 1 wherein said tray comprises a plurality of wells for receiving said dough product.

7. A packaging system in accordance with claim 1 wherein said dough product is chemically leavened.

8. A packaging system in accordance with claim 1 wherein said dough product is leavened with yeast.

9. A method for making a packaged dough product suitable for extended refrigerated storage comprising:
   (a) combining flour, a leavening agent and a fluid in amounts sufficient to form a dough mass;
   (b) subjecting said dough mass to mixing under conditions whereby the leavening agent is at least partially reacted;
   (c) forming said dough mass into a unbaked dough product;
   (d) placing said unbaked dough product into a container which has sufficient volume to provide headspace to at least partially surround said dough product;
   (e) displacing ambient air in the headspace surrounding said unbaked dough product with a gas consisting essentially of carbon dioxide or carbon dioxide and inert gas mixture from outside the container; and
   (f) hermetically sealing said container after displacing the ambient air in the headspace with the gas, the carbon dioxide filling said headspace in a volume ratio of carbon dioxide in the headspace to carbon dioxide in the dough product of from about 0.3:1 to about 1.7:1 thereby inhibiting and minimizing the leavening reaction of the unbaked dough to prevent further production of carbon dioxide in the dough and to maintain the dough leavening capability over the shelf life of the unbaked dough.

10. A method in accordance with claim 9 wherein said carbon dioxide is present in said headspace gas at a level of from about 10 volume % to 100 volume %.

11. A method in accordance with claim 9 wherein the dough product is selected from the group consisting of a sweet roll, coffee cake, muffin and brownie dough product.

12. A method in accordance with claim 9 wherein said headspace gas is a mixture of an inert gas and an equilibrium level of carbon dioxide.

13. A method in accordance with claim 9 wherein said dough product is chemically leavened.

14. A method in accordance with claim 9 wherein said dough product is leavened with yeast.

* * * * *